US005270097A

United States Patent [19]

Amemiya et al.

[11] Patent Number: 5,270,097

[45] Date of Patent: Dec. 14, 1993

[54] DECORATIVE SHEET

[75] Inventors: Hiroyuki Amemiya; Hatiro Uekawa; Taizi Ishii, all of Tokyo, Japan

[73] Assignee: Dai Nippon Insatsu Kabushiki Kaisha, Japan

[21] Appl. No.: 489,949

[22] Filed: Mar. 9, 1990

[30] Foreign Application Priority Data

Mar. 10, 1989 [JP] Japan .................................. 1-59184
Aug. 9, 1989 [JP] Japan .................................. 1-206449

[51] Int. Cl.[5] .......................... B32B 33/00; B44C 1/24

[52] U.S. Cl. .................................... 428/156; 428/151; 428/161; 428/163; 428/167; 428/172; 428/203; 428/204; 428/913.3

[58] Field of Search ............... 428/163, 167, 172, 161, 428/156, 151, 142, 913.3, 203, 204

[56] References Cited

U.S. PATENT DOCUMENTS

| | | | |
|---|---|---|---|
| 2,066,497 | 1/1927 | Watkins | 428/151 |
| 2,587,594 | 3/1952 | Chavannes | 428/167 |
| 3,338,730 | 8/1967 | Slade | 428/163 |
| 3,832,541 | 8/1974 | Bassett | 428/163 |
| 4,409,276 | 10/1983 | Martinelli | 428/163 |
| 4,409,280 | 10/1983 | Wiley | 428/172 |
| 4,423,103 | 12/1983 | Bogdany | 428/167 |
| 4,595,621 | 6/1986 | Valenti | 428/172 |

FOREIGN PATENT DOCUMENTS

| | | | |
|---|---|---|---|
| 2919847 | 10/1980 | Fed. Rep. of Germany | 428/151 |
| 28683 | 3/1978 | Japan | 428/204 |
| 123460 | 9/1980 | Japan | 428/163 |
| 160631 | 12/1980 | Japan | 428/167 |
| 123656 | 7/1984 | Japan | 428/151 |
| 192600 | 8/1989 | Japan | 428/167 |
| 311000 | 12/1989 | Japan | 428/167 |
| 268904 | 4/1927 | United Kingdom | 428/167 |

*Primary Examiner*—Alexander S. Thomas
*Assistant Examiner*—Nasser Ahmad
*Attorney, Agent, or Firm*—Wegner, Cantor, Mueller & Player

[57] ABSTRACT

A decorative sheet comprises a transparent or translucent base sheet having a rear surface on which protrusion and recess patterns are formed and a bright set-solid print layer or bright pattern print layer formed on a side of the protrusion and recess patterns of the base sheet. Each of the protrusion and recess patterns is composed of parallel lines, continuous curved lines or a combination of the parallel lines and the curved lines each composed of protruded and recessed portions each in form of a groove having a width of 1 to 100 μm. The base sheet has a front surface on which a transparent resin layer may be formed. The transparent resin layer is formed of a hardenable resin. The decorative sheet also comprises the base sheet having a rear surface on which protrusion and recess patterns are formed, grain patterns formed on a side of the protrusion and recess patterns of the base sheet, and a bright set-solid print layer formed on a rear side of the grain patterns Each of the protrusion and recess patterns being composed of a parallel lines, continuous curved lines or a combination of the parallel lines and the curved lines each composed of protruded and recessed portions each in form of a groove having a width of 1 to 100 μm.

3 Claims, 5 Drawing Sheets

DECORATIVE SHEET

BACKGROUND OF THE INVENTION

The present invention relates to decorative sheets to be utilized in various fields.

It is well known in conventional art to form protrusions and recesses on a decorative sheet to improve outer decorative appearance and, as a decorative sheet of this character, is known a sheet made of thermoplastic resin on a front surface of which protrusion and recess patterns are formed. However, the formation of these protrusion and recess patterns on the front surface of the decorative sheet involves problems such as of a lessened anti-contamination property of the front surface Particularly, foreign materials such as dust invade into the protruded and recessed portions of the front surface of the decorative sheet, resulting in spoiling of the outer appearance and damaging and wearing of the shapes of the protrusions and recesses. Such problems may be solved by forming the protrusions and recesses on the rear surface of the base material of the decorative sheet. However, the decorative sheet is usually utilized by applying it to another sheet or plywood, and in the latter type decorative sheet in which the decorative pattern is formed on the rear surface of the base material, the effects depending on the design of the decorative patterns cannot be fully attained in view of the direction of a lighting source or the direction of observation of a viewer. Furthermore, in the conventional technique, the protrusion and recess patterns are formed by vascular patterns or regular or irregular patterns with dots and, moreover, the pitches of the dots of the protrusion and recess patterns are coarse, so that the conventional decorative pattern is simple and, hence, does not provide a superior design appearance.

SUMMARY OF THE INVENTION

An object of the present invention is to substantially improve defects in the prior art and to provide decorative sheets of improved outer cubic appearance, design characteristics and physical properties.

This and other objects can be achieved in one aspect according to the present invention by providing a decorative sheet comprising a transparent or translucent base sheet having a rear surface on which protrusion and recess patterns are formed and a bright set-solid print layer or bright pattern print layer formed on a side of the protrusion and recess patterns of the base sheet, each of the protrusion and recess patterns being composed of parallel lines, continuous curved lines or a combination of the parallel lines and the curved lines each composed of protruded and recessed portions each in form of a groove having a width of 1 to 100 μm.

In preferred embodiments, the base sheet has a front surface on which a transparent resin layer is formed. The transparent resin layer is formed of a hardenable resin. A pattern print layer is formed on a side of the protrusion and recess patterns of the base sheet. A color set-solid print layer is formed on a rear surface side of the bright set-solid print layer or bright pattern print layer. The protrusion and recess patterns are formed on the rear surface side of the base sheet after the formation of the respective print layers.

In another aspect of the present invention, there is provided a decorative sheet comprising a transparent or translucent base sheet having a rear surface on which protrusion and recess patterns are formed, grain patterns formed on a side of the protrusion and recess patterns of the base sheet, and a bright set-solid print layer formed on a rear side of the grain patterns, each of the protrusion and recess patterns being composed of parallel lines, continuous curved lines or a combination of parallel lines and curved lines each composed of protruded and recessed portions each in the form of a groove having a width of 1 to 100 μm.

In preferred embodiments, the base sheet has a front surface on which a vascular pattern printed with matting ink is formed with a transparent resin layer interposed between the front surface of the base sheet and the vascular pattern. The protrusion and recess pattern may be composed of aggregation of wave-shaped parallel curves each enclosed in a curved section, each of protruded and recessed portions of the protrusion and recess patterns is formed in a groove having a width of 1 to 100 μm and the grain pattern including wood grains.

The protrusion and recess patterns are composed of groups of parallel curves by parallelly displacing the wave-shaped curve and an orientation of the wave-shaped curves is crossed to an orientation of the grain pattern.

DESCRIPTION OF THE PREFERRED EMBODIMENTS

Figure 1:
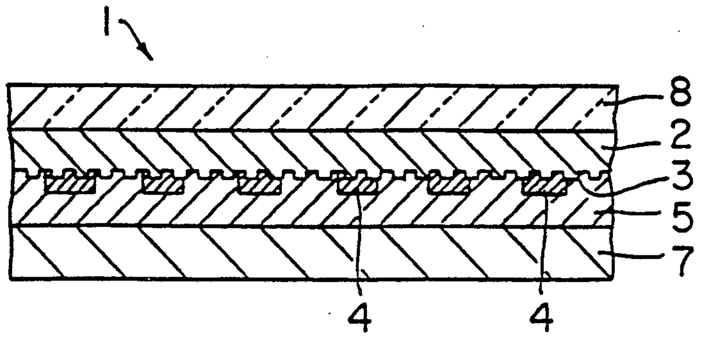
FIG. 1 is an elevational section of a decorative sheet according to the present invention.

Referring to FIG. 1 representing a first embodiment according to the present invention, a decorative sheet 1 comprises a base sheet 2 having a rear surface on which protrusion and recess patterns 3 are formed. A pattern print layer 4 is formed on the protruded and recessed surface of the base sheet 2 and a bright set-solid print layer 5 is applied on the pattern print layer 4, i.e. the protruded and recessed surface. A color set-solid print layer 7 is further formed on the rear, lower as viewed in FIG. 1, surface of the bright set-solid print layer 5. A transparent resin layer 8 is integrally laminated on the front, (upper as viewed,) surface of the base sheet 2.

The base sheet 2 may be formed of a material having a transparent or translucent property on which the decorative protrusion and recessed patterns 3 can be formed, the material being such as cellophane, acetate, polyethylene, polypropylene, polyester, polyvinyl chloride, polyvinylidene chloride, ,polystyrene, polycarbonate, polyvinyl alcohol or polyamide.

It will be desired that the base sheet 2 has a thickness of 0.05 to 0.2 mm. The formation of the protrusion and recess patterns 3 on the base sheet 2 may be performed by conventional embossing working and, for example, by utilizing an emboss press provided with protrusion and recess patterns formed by a photo-etching method and heating and pressing the base sheet 2. Such embossing working may be performed before the printing of the respective print layers, but it is preferred to perform the embossing working after the printing of the print layers for obviating defects in the embossing working such as appearance of connected pattern portions.

Figure 2:
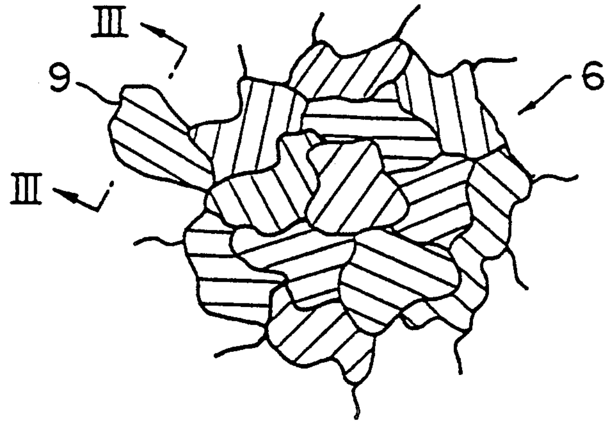
FIG. 2 is a partial plan view showing one example of protrusion and recess patterns formed on the decorative sheet.
Figure 3:
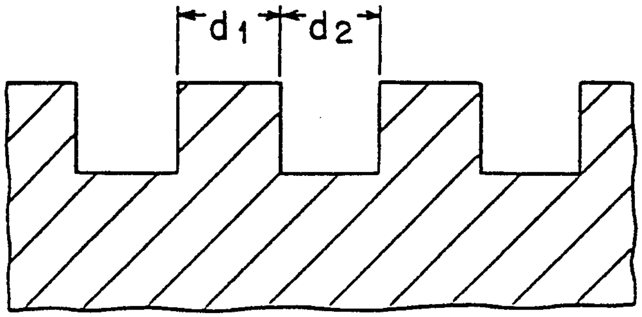
FIG. 3 is a sectional view taken along the line III—III shown in FIG. 2.
Figure 4:
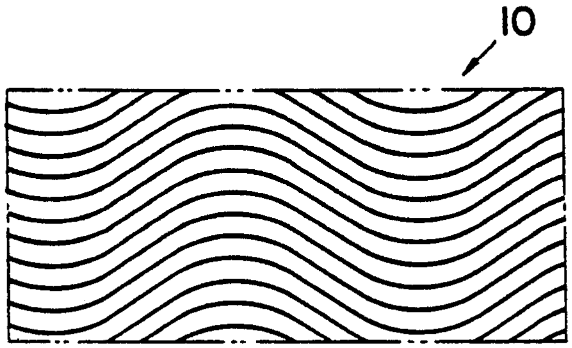
FIG. 4 shows a modification of the protrusion and recess patterns of the decorative sheet according to the present invention.

The protrusion and recess patterns 3 may be formed by groups of parallel lines 6 as shown in FIG. 2 or by groups of continuous wave-shaped curves 10 as shown in FIG. 4. The latter patterns may be formed by parallelly arranging a plurality of patterns each formed by connecting a sinusoidal wave, a cycloid wave, and a circular arc wave and these patterns may be arranged in a regular interval or irregular interval. The combination of the groups of lines 6 and the groups of curves 10 may be most preferred. In a further alternation, as shown in FIG. 2, the protrusion and recess patterns 3 may be formed in one section 9 enclosed by a curve in which a group of parallel lines 6 extending in the same direction is formed and two other sections in which the extending directions of the parallel lines are different from that of the first mentioned section 9. In the formation of such patterns, it is desired that the directions of the parallel lines in the respectively adjacent sections be all different from each other. In order to obtain a matt-pattern having a luster different according to the direction of the viewer, it will be desired that the widths $d_1$ and $d_2$ of the protruded and recessed portions of the pattern 3 be within a range of 1 to 100 μm (FIG. 3) and the depth of the recess is of 1 to 100 μm, particularly 5 to 30 μm.

The pattern print layer 4 may be formed on the front side surface of the base sheet 2, for example, on the surface of the transparent resin layer 8, as well as on a side of the rear surface of the base sheet 2 on which the protrusion and recess patterns 3 are formed. In a case where the pattern print layer 4 is applied on the side on which the protrusion and recess patterns 3 are formed, it is desired to utilize a vehicle such as acrylic series resin, vinylacetate series resin, nitro-cellulose, aminoalkyd resin, or butyral resin, and ink or coating agent including a coloring agent and plasticizing agent in addition to the vehicle used. On the contrary, in a case where the pattern print layer 4 is formed on the front surface side of the base sheet 2, it is desired for the ink or coating to utilize a vehicle such as cellulose derivative such as nitro-cellulose, acetyl-cellulose, benzyl-cellulose, phenol series resin, urea series resin, phthalic acid series resin, maleic acid series resin, melamine series resin, polyvinyl acetate series resin, polyvinyl chloride series resin, acrylic series resin, polyvinyl alcohol, polyvinyl butyral, epoxy series resin, silicone resin, polyester series resin, polyamide series resin, polyurethane series resin, other synthetic resin, or rubber derivative such as rubber chloride, cyclized rubber or synthetic rubber. Particularly, in view of the anti-friction property and anti-contamination property, it is desired to utilize an ink or coating agent whose vehicle comprises thermosetting type resin such as phenol series resin, urea series resin, melamine series resin or epoxy series resin, thermosetting type polyester series resin, polyurethane resin. In an alternation, a resin made as ultraviolet-hardening type resin by adding an ultra-violet-setting agent may be utilized. A gravure, flexo or silk screen printing method may be utilized as a printing method. A matting agent such as powder of calcium carbide, precipitating barium carbide, silica, talc, clay or silas balloon may be added in the pattern print layer 4 as occasion demands preferably by the amount of 1 to 20 weight parts with respect to 100 weight parts of the ink.

As the bright ink constituting the bright set-solid print layer 5 is utilized an ink including a metallic brightening pigment utilizing a metallic powder such as copper powder, aluminum powder, or brass powder, or metallic flake together with pigment, mica pigment such as titanium dioxide covered mica, or pigment having pearl luster or influence luster such as fish scale foil or bismuth acid chloride. Preferably, in view of the chemical stability such as acid-proof property or alkali-proof property, it is desired to use ink including the mica pigment. Particularly, in a case where the decorative sheet 1 will be bonded to another base sheet with a bonding agent of vinyl chloride/vinyl acetate copolymer series, the brightness is reduced when the ink including the aluminum powder, but when the ink including the titanium-dioxide covered mica is utilized, a reduction of the brightness is not observed and a good result will be obtained.

Known materials to be utilized as the vehicle for the ink for the bright set-solid print layer 5 will be listed up such as those referred to the material for the ink forming the pattern print layer 4 and the gravure printing, flexo printing or silk screen printing technique will be adopted as the printing method for the bright set-solid print layer 5.

Although not specifically shown in the figures, it may be possible to form a bright pattern print layer printed in patterns by utilizing a bright ink instead of the formation of the bright set-solid print layer 5 printed by utilizing the bright ink. For example, in a case where luster of grain of a wood is to be displayed, it will be preferred to carry out the bright pattern printing only to a portion of the luster of the grain in view of the true reappearance of the wood grain.

The color set-solid print layer 7 to be formed on the rear surface side of the bright set-solid print layer 5 or bright pattern print layer is formed by gravure printing, flexo printing or silk screen printing method by utilizing the ink or coating substantially identical to that utilized for the formation of the pattern print layer 4 on the side of the protrusion and recess patterns 3. The thickness of the color set-solid print layer 7 may be selected on the basis of the hiding property and color tone to be required. Particularly, in the case of applying the hiding property to the decorative sheet 1, a pigment having a high hiding power such as titanium dioxide will be utilized.

The transparent resin layer 8 formed on the front surface side of the base sheet 2 is formed of a resin such as polyvinyl chloride resin, urethane series resin, acrylic series resin or epoxy series resin and, particularly, it will be desired to utilize a thermosetting resin such as polyurethane series resin or epoxy resin or an ultraviolet-hardening type resin including an ultraviolet-hardening agent in view of the anti-friction property and anti-contamination property. The transparent resin layer 8 can be formed by coating a coating agent consisting of the resin described above by a gravure coating, roll coating, knife coating or airknife coating method. The provision of the transparent resin layer 8 can improve the anti-wearing property, the anti-chemical property and the anti-contamination property.

Figure 5A:
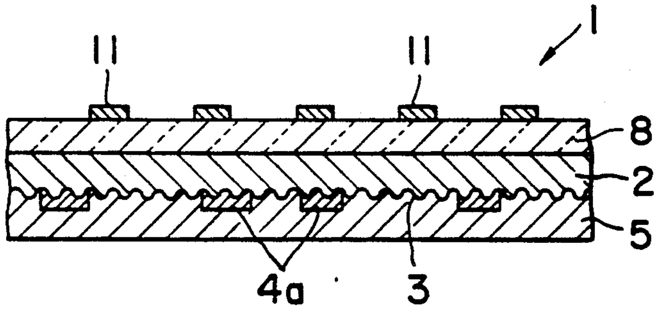
FIG. 5A shows another modification of the protrusion and recess pattern of the decorative sheet according to the present invention.
Figure 5B:
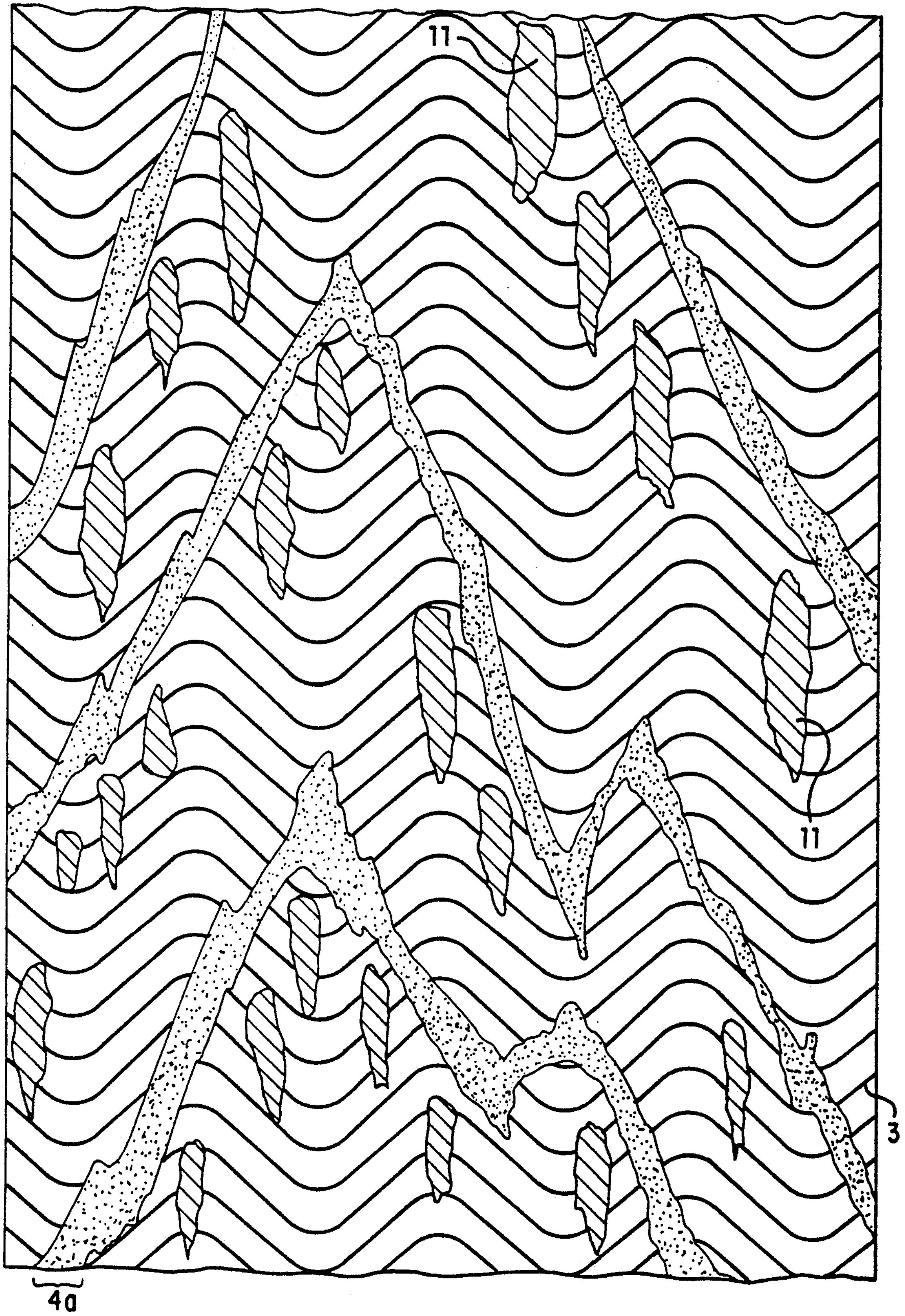
FIG. 5B is a top view of the invention shown in FIG. 5A.
Figure 6:
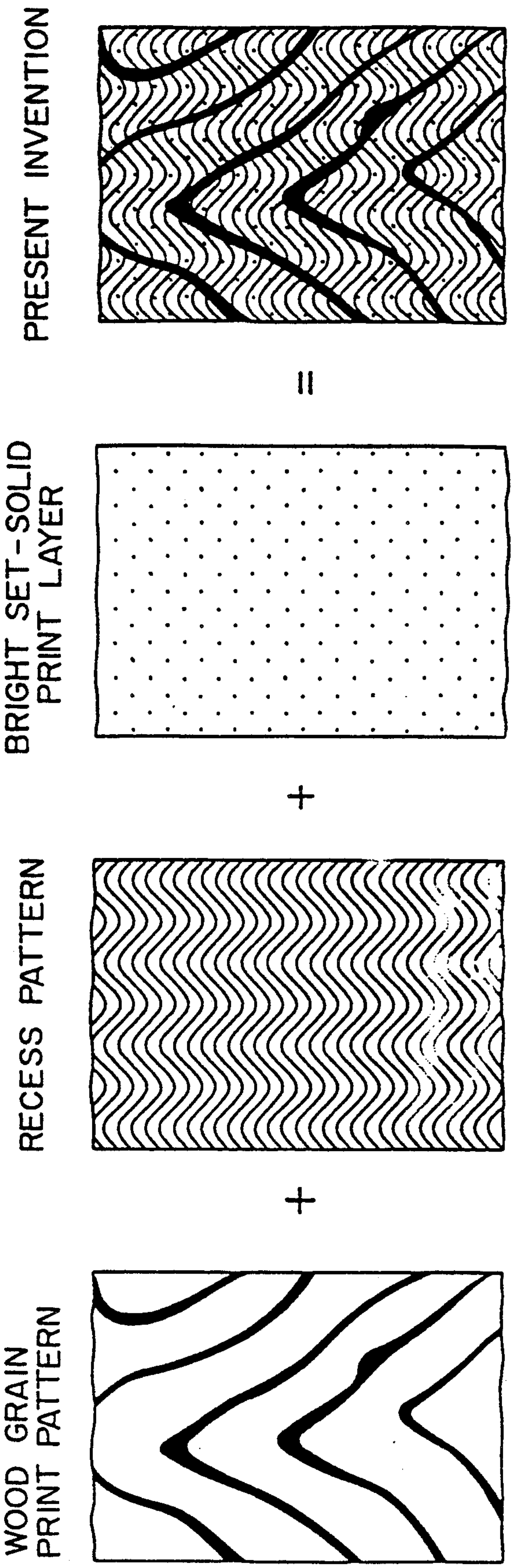
FIG. 6 shows patterns in which grain print patterns are formed so as to be normal to orientations of the protrusion and recess patterns.
Figure 7:
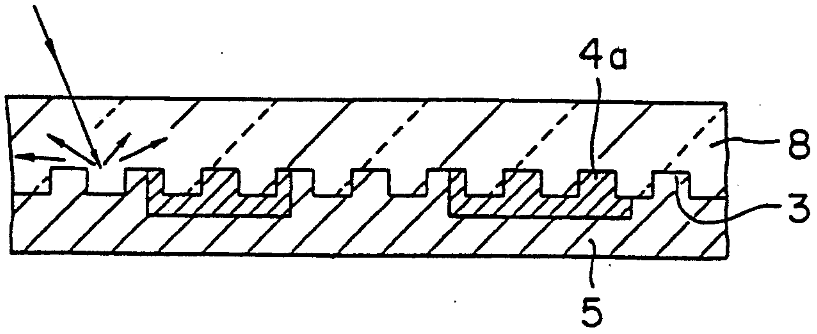
FIG. 7 is a sectional view of the decorative sheet on which the patterns shown in FIG. 6 are formed.
Figure 8:
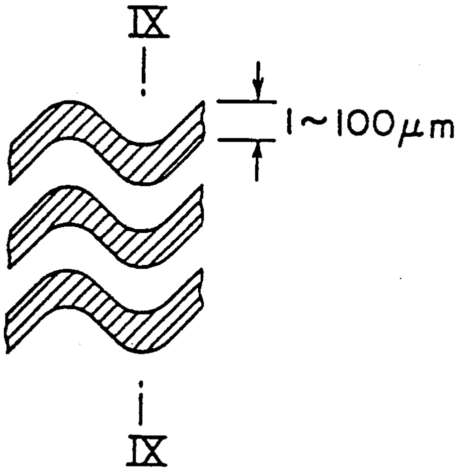
FIG. 8 is an enlarged view of a portion enclosed by a circle A in FIG. 6.
Figure 9:
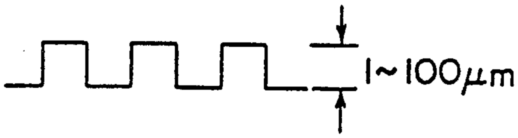
FIG. 9 is a sectional view taken along the line IX—IX shown in FIG. 8.
Figure 10:
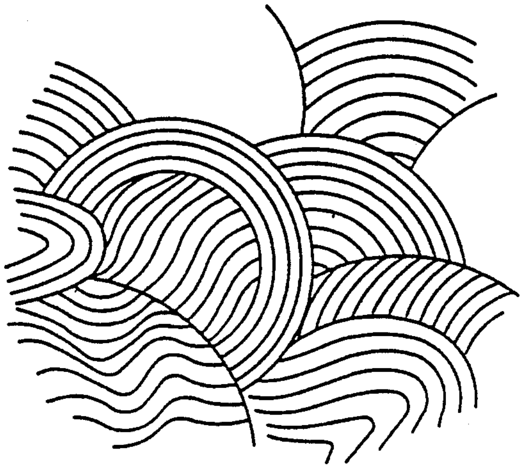
FIG. 10 is a partial plan view of the patterns of aggregation of wave-shaped grooves within an enclosed curved section.

The decorative sheet 1 of the embodiment according to the present invention may be composed of as shown in FIGS. 5A and 5B. Referring to the decorative sheet 1 of FIGS. 5A and 5B, the protrusion and recess patterns 3 composed of the wave-shaped curves such as shown in FIG. 4 is formed on the rear surface of the base sheet 2. Then, as a pattern print layer, wood grain print patterns 4*a* are formed on the protrusion and recess pattern side such that the orientation (arrowed direction in FIG. 4) of the wave-shaped curves of the protrusion and recess patterns 3 is crossed to the orientation of the wood grains (FIGS. 6 to 9). The bright set-solid print layer 5 is further formed on the rear surface side of the grain print patterns 4*a*and vascular print patterns 11 are formed with a matting ink on the front surface side of the base sheet 2 through the transparent resin layer 8. According to such arrangement of print patterns, the luster of the grain substantially similar to that of the natural wood, particularly the grain of the straight grain wood, can be reappeared by the effects attained by the combination of the protrusion and recess patterns, grain print patterns and the bright set-solid print layer and, moreover, so-called a gloss matt effect in which the vascular patterns are observed to be recessed in an appearance can be attained in comparison with the gloss of the transparent resin layer 8 with the vascular patterns formed with the mat ink, thus forming the grain patterns extremely similar to those of the natural wood. Of course, the elimination of the vascular patterns will not substantially affect on the appearance similar to the grain of the natural wood. It will be preferred to form the vascular patterns 11 by utilizing the ink with a vehicle formed of a setting resin such as thermosetting resin for improving the anti-friction property. In a case where the curly grain patterns of the wood are formed as knob-like, spot-like, knothole-like and/or snail-like patterns, it will be most preferred, in order to effectively reappear the luster of the patterns, to form an aggregation of patterns having grooves composed of wave-shaped parallel curves within an enclosed curve section such as shown in FIG. 10. It will be also desired to form the wave-shaped protrusion and recess patterns 3 and the bright set-solid print layer on the entire surface in case of luster throughout the entire surface and, in case of partial luster, it will be desired to form the patterns only on the luster portion. For the formation of the vascular patterns, a pigment of black or brown color type may be usually added.

The decorative sheet 1 according to the present invention can be produced as a beautiful decorative board or plywood by bonding the decorative sheet with the protrusion and recess patterns 3 of the base sheet 2 directed downward to a board.

The present invention will be described further in detail hereunder with reference to preferred examples.

EXAMPLE 1

Protrusion and recess patterns were formed on a vinyl chloride sheet of translucent brown series color having a thickness of 0.15 mm by utilizing an emboss roll provided with wave-shaped parallel slit patterns, each slit having widths of protrusion and recess of 30 μm and a depth of a press of 10 μm and by utilizing a heating drum with a heating temperature of the heating drum of 150° C., a temperature of the emboss roll of 60° C., a wire pressure of 1 t, and a sheet feeding speed of 10 m/min.

In the next step, the protruded and recessed surface of the sheet effected with the protrusion and recess patterns was effected with grain printing operation by the gravure printing method and a bright print layer was printed by utilizing a pearl ink including mica powder by means of a 60 μm set-solid press.

Furthermore, a surface protecting layer was formed by gravure coating a thermosetting urethane resin on the surface of the vinyl chloride sheet by means of the 60 μm set-solid press. In accordance with the described manner a decorative sheet was prepared and the thus prepared sheet was superior in the luster of the grain, a cubic appearance and physical properties of the surface thereof.

EXAMPLE 2

A decorative sheet was prepared in a manner substantially the same as that described with respect to the example 1 except that vascular patterns were printed in the grain printing time. The decorative sheet was laminated to a plywood by an urethane series bonding agent to thereby form a decorative laminated board, which was superior in the design characteristic in combination of the luster of the grain with the superior cubic appearance of the grain and the vascular patterns and the protrusion and recess patterns of the decorative sheet. The physical properties of the surface of the decorative laminated board resulted in good conditions.

EXAMPLE 3

A matrix printing of the grain of a wood was effected to the rear surface side of a translucent brown series polyvinyl chloride sheet having a thickness of 0.2 mm with an ink having a vehicle of polyvinyl chloride by the gravure printing method. After this printing operation, a set-solid print layer was formed with a pearl ink including mica powder with a depth of 60 μm and a dark brown series set-solid print layer was then formed on the rear surface of the thus formed sheet so as to have a depth of 60 μm. In the next step protrusion and recess patterns were formed on the printed surface of the thus formed sheet by utilizing an emboss press provided with wave-shaped parallel slit patterns, each slit having widths of protrusion and recess of 30 μm and a depth of a press of 15 μm and having a circle, a quarter of which is connected to a quarter of the adjacent circle so that the protruding directions thereof are alternatingly reversed and by utilizing a heating drum with a heating temperature of the heating drum of 150° C., a temperature of the emboss press of 60° C., a wire pressure of 1 t, and a sheet feeding speed of 10 m/min. In this case, the orientation of the grain pattern is across the orientation of the protrusion and recess patterns.

In the next step, an ultraviolet-hardening type acrylic ink is entirely coated on the surface reverse to the surface of the sheet on which the protrusion and recess patterns were formed by a reverse roll coating method. Thereafter, a transparent resin layer was formed by irradiating the ultraviolet rays to harden the resin. The thus formed decorative sheet was superior in an anti-solvent property, anti-friction property and hiding power and in the luster of the grain.

EXAMPLE 4

A matrix printing operation was effected to a polyvinyl chloride sheet having a thickness of 0.15 mm by the manner substantially the same as that of the example 3 and a set-solid print layer was then formed with a pearl ink. Thereafter, protrusion and recess patterns were formed by an emboss press provided with wave-shaped parallel slit patterns similar to those described with reference to the example 3. In the next step, a thermosetting type urethane ink was coated by the gravure printing method on the surface opposite to the surface on which the protrusion and recess patterns were formed by utilizing a 65$\mu$ set-solid press and then coated to form a transparent resin layer. Vascular patterns were thereafter printed with a thermosetting type urethane ink including silica series matting agent on the surface of the thus formed transparent resin layer to form a decorative sheet.

The thus formed decorative sheet was laminated on a plywood with the protrusion and recess patterns directed to the plywood to thus form a decorative laminated board.

The decorative laminated board was superior in the design characteristic in combination of the luster of the grain with the cubic appearance of the grain and the vascular patterns and the protrusion and recess patterns of the decorative sheet and, moreover, superior in the anti-solvent property and the anti-friction property of the surface of the laminated board.

The following effects can be attained by the decorative sheets of the present invention of the characters described above.

Since the protrusion and recess patterns are formed on the rear surface side of the base sheet of the decorative sheet and the bright print layer is further formed on the surface on which the protrusion and recess patterns are formed, the design effect due to the protrusion and recess patterns cannot be spoiled in a case where the decorative sheet is bonded to another sheet or plywood.

Since the protrusion and recess patterns are not formed on the front surface side of the base sheet, the prepared decorative sheet is superior in the anticontamination property and any foreign material such as dust never intrude into the protrusion and recess patterns, thus not damaging the outer appearance of the decorative sheet.

Since the protrusion and recess patterns are preferably formed by parallel straight lines, parallel curved lines or the combination of these lines so as to have the widths of each protrusion and each recess of 1 to 100 $\mu$m, the superior cubic outer appearance can be obtained by observing the variously changing reflected light for a viewer, and in addition, since the protrusion and recess patterns are of fine shapes, the parallel slit patterns are not remarkably viewed, thus not lowering the design effects.

The formation of the transparent resin layer on the front surface side of the base sheet can protect the surface thereof and, particularly, when a hardening type resin such as thermosetting type resin is used for the transparent resin layer, superior anti-wearing property, anti-chemical property, anti-contamination property and other properties can be achieved.

The addition of the mica pigment as a brighting pigment in the bright set-solid print layer or bright pattern print layer can preferably prevent the color change and degradation of the brighting property due to chemical reaction of the bonding agent when the decorative sheet of the present invention is bonded to another sheet or board. In this meaning, various types of bonding agents will be utilized.

The formation of the pattern print layer on the side of the surface of the base sheet on which the protrusion and recess patterns are formed further improves the anti-wearing property and anti-contamination property of the print layers for the base sheet and the transparent resin layer. In addition, the reality of the displayed grain patterns can be improved in comparison with the natural wood grain patterns.

The further formation of the color set-solid print layer on the rear surface side of the bright set-solid print layer or bright pattern print layer can adjust the tone of the entire decorative sheet and can be possessed with the hiding property to the color of the base sheet, contamination and flaws thereof.

The defect caused by the usage of the emboss press will be substantially eliminated and the connecting portions of the patterns will not stand out by forming the protrusion and recess patterns after the formation of the respective print layers on the base sheet.

According to the decorative sheet which is formed by forming the protrusion and recess patterns composed of the wave-shaped parallel slit patterns, applying grain print on the surface of the protrusion and recess patterns, then applying the bright set-solid print layer, and forming the vascular patterns formed with matting ink on the surface opposite to the surface of the base sheet on which the protrusion and recess patterns through the transparent resin layer, the decorative sheet riches in the variously changing luster in the lighting directions and directions of the viewer and in depth. In addition, the decorative sheet can provide a luster substantially close to the luster of natural wood grain and the vascular patterns can be observed to be recessed in appearance, and the usage of the hardening type ink for forming the vascular patterns can improve the anti-wearing property of the vascular patterns.

What is claimed is:

1. A decorative sheet comprising:

a transparent or translucent base sheet having a rear surface on which protrusion and recess patterns are formed;

wood grain patterns formed on a surface of the protrusion and recess patterns facing away from the base sheet; and a reflective print layer formed on a side of the grain patterns that is opposite the surface adjacent the protrusion and recess patterns, said protrusion and recess patterns being composed of parallel lines, continuous curved lines or a combination of the parallel lines and the curved lines, and each of said protrusion and recess patterns being composed of protruded and recessed portions each having a width of 1 to 100 $\mu$m, wherein said base sheet has a front surface on which a vein pattern printed with matting ink is formed with a transparent resin layer interposed between the front surface of the base sheet and the vein pattern.

2. The decorative sheet according to claim 1, wherein said protrusion and recess patterns are composed of an aggregation of wave-shaped parallel curves positioned in sections enclosed by curves.

3. The decorative sheet according to claim 1, wherein said protrusion and recess patterns are composed of wave-shaped parallel curves which are oriented across the wood grain pattern.

* * * * *